United States Patent
Petit et al.

(10) Patent No.: US 6,472,785 B2
(45) Date of Patent: Oct. 29, 2002

(54) MODULAR CONVERTER

(75) Inventors: Serge Petit, Roullet (FR); Jean-Marc Petillon, Fleac (FR); Alain Buisson, Brindas (FR); Régis Giraud, Angouleme (FR)

(73) Assignee: Moteurs Leroy-Somer, Angouleme (FR)

( * ) Notice: Subject to any disclaimer, the term of this patent is extended or adjusted under 35 U.S.C. 154(b) by 3 days.

(21) Appl. No.: 09/776,906

(22) Filed: Feb. 6, 2001

(65) Prior Publication Data

US 2001/0015583 A1 Aug. 23, 2001

(30) Foreign Application Priority Data

Feb. 11, 2000 (FR) ............................................. 00 01748

(51) Int. Cl.[7] .................................................. H02K 5/00
(52) U.S. Cl. .......................................... 310/71; 310/89
(58) Field of Search ............................... 310/89, 71, 91, 310/68 R, 43, 58–64; 29/596–598; 165/80.1–80.3, 185; 361/679, 728, 707, 715

(56) References Cited

U.S. PATENT DOCUMENTS

| | | | | |
|---|---|---|---|---|
| 4,210,833 A | * | 7/1980 | Neveux ........................ 310/58 |
| 4,250,422 A | * | 2/1981 | Tahara et al. .................. 310/58 |
| 4,539,498 A | * | 9/1985 | Wilkes .......................... 310/58 |
| 5,006,744 A | * | 4/1991 | Archer et al. .................. 310/89 |
| 5,185,544 A | * | 2/1993 | Takada .......................... 310/58 |
| 5,610,456 A | * | 3/1997 | Wille et al. .................... 310/58 |
| 5,777,843 A | * | 7/1998 | Younce ....................... 361/641 |
| 6,012,512 A | * | 1/2000 | Ghiani ........................ 165/140 |
| 6,181,570 B1 | * | 1/2001 | Ellebrecht et al. .......... 361/797 |

FOREIGN PATENT DOCUMENTS

| | | |
|---|---|---|
| DE | 197 04 226 A | 8/1998 |
| EP | 0 577 201 A | 1/1994 |
| EP | 0 898 213 A | 2/1999 |
| GB | 2 167 608 A | 5/1986 |

* cited by examiner

Primary Examiner—Tran Nguyen
(74) Attorney, Agent, or Firm—Oliff & Berridge, PLC

(57) ABSTRACT

A converter for an electric motor or transformer, the converter being comprising a connection box having passages for electrical conductors and having a semiconductor electronic module removably fixed to the connection box. The electronic module has a radiator-forming box that is open at one end, at least one electronic card at least partially embedded in a resin cast inside said radiator-forming box, and at least one connector emerging from the resin. The opening of the radiator-forming box enables it to be fitted to the connection box. The connection box has at least one window giving access to the connector(s) of the electronic module.

12 Claims, 4 Drawing Sheets

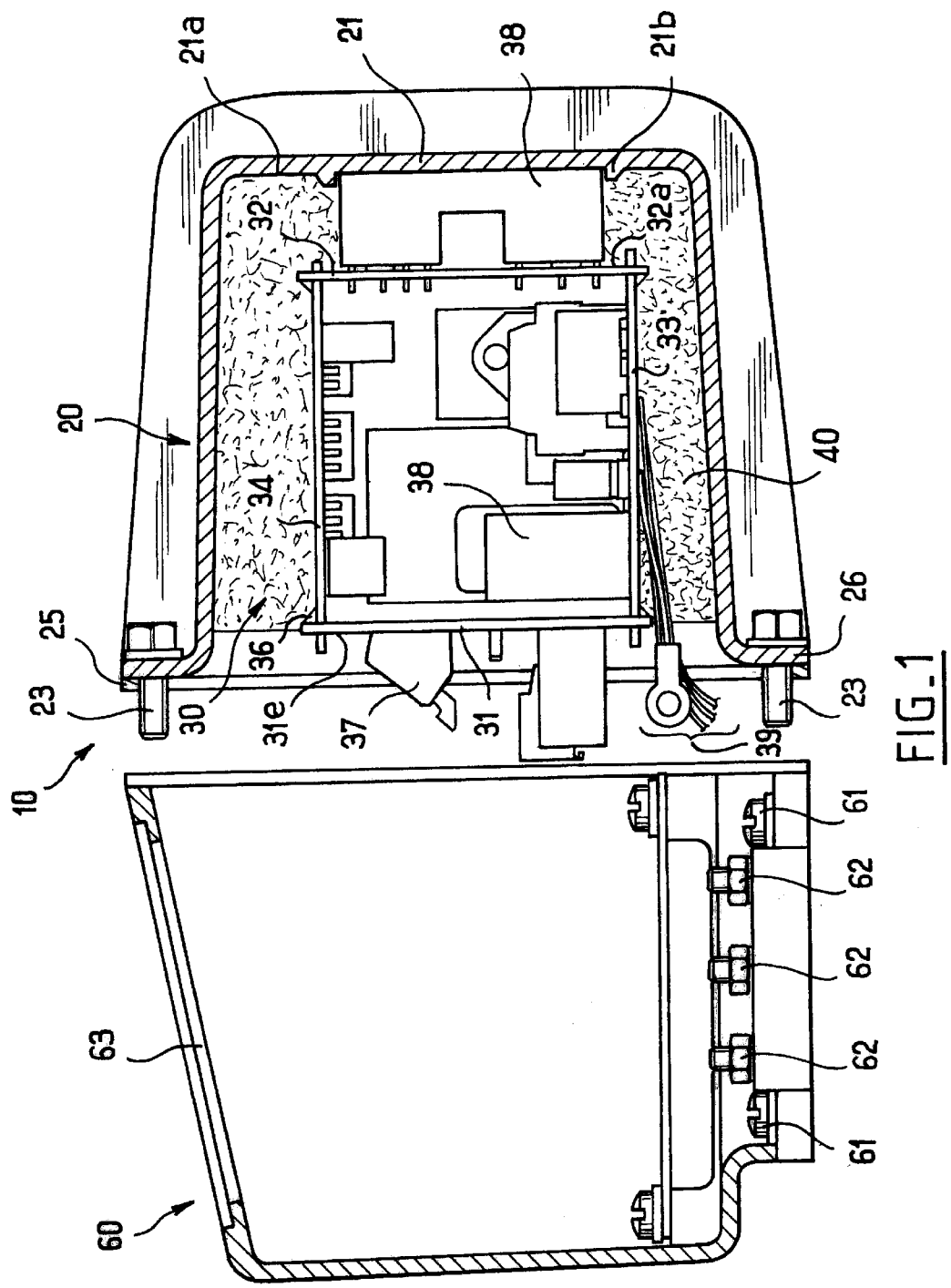
FIG_1

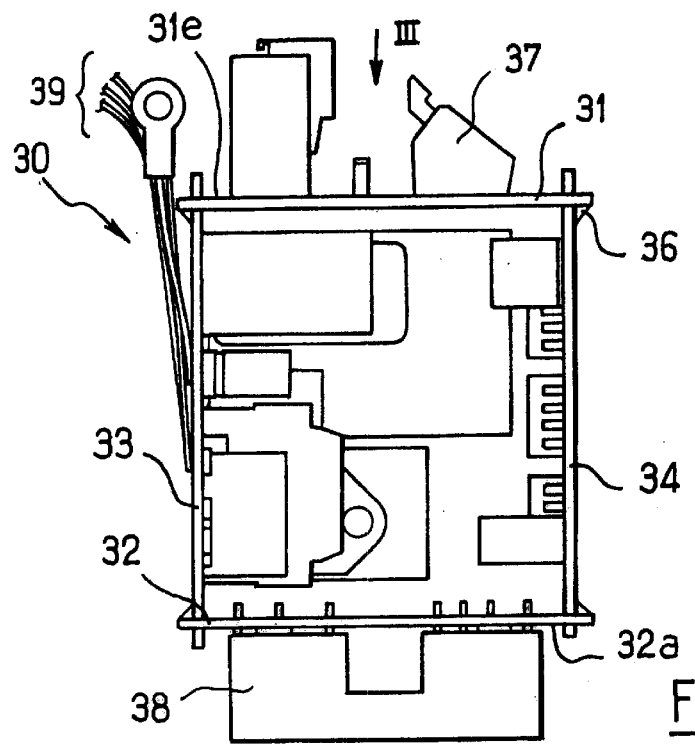
FIG_2
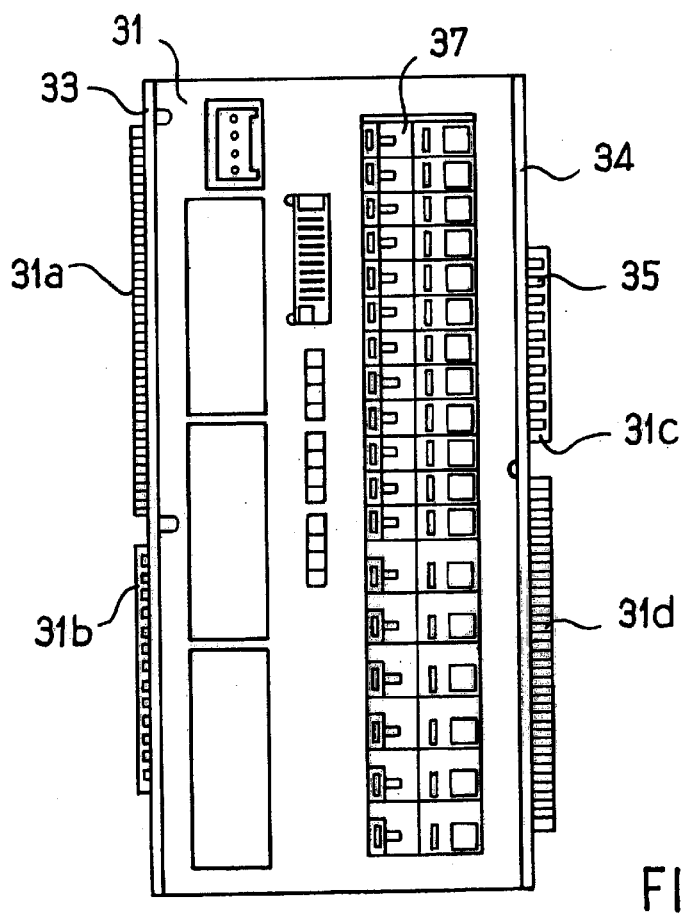
FIG_3

MODULAR CONVERTER

The present invention relates to a converter for an electric motor or a transformer and more particularly but not exclusively a converter for a motor that is asynchronous or synchronous, that has permanent magnets, or that operates on DC.

BACKGROUND OF THE INVENTION

The term "converter" is used to cover inverters and drives, i.e. any static semiconductor apparatus enabling an electric motor to be controlled or frequency to be changed when feeding an electric transformer.

Converters are known that comprise electronic cards received in a box fixed on the motor.

The drawback of such known converters is that in the event of an electronic failure, it is necessary to replace the entire box, which means that the box must be separated from the motor.

Furthermore, each box is specific to a given motor which gives rise to relatively high manufacturing costs when a motor is made in a short manufacturing run only.

OBJECTS AND SUMMARY OF THE INVENTION

The invention seeks to provide a novel converter which makes it possible in particular to replace faulty electronic cards easily.

Another object of the invention is to reduce the cost price of the converter.

The invention achieves this by the fact that the converter comprises a connection box having passages for electrical conductors, and a semiconductor electronic module releasably fixed to the connection box, said electronic module comprising a radiator-forming box that is open at one end, at least one electronic card that is at least partially embedded in a resin cast into the inside of said radiator-forming box, and at least one connector emerging from the resin, the opening of the radiator-forming box being arranged in such a manner as to enable it to be fitted to the connection box, the connection box having at least one window giving access to the connector(s) of the electronic module.

By means of the invention, the electronic module of the converter can easily be replaced without it being necessary to separate the connection box from the electric motor or transformer on which it is fixed.

Furthermore, electrical connections can easily be established by the user when the radiator-forming box and the connection box are fixed to each other by means of the access window provided in the connection box.

Furthermore, the fact that the electronic card(s) of the electronic module is/are embedded in a resin cast into the inside of the radiator-forming box guarantees that the electronic module is reliable and electrically insulated.

Advantageously, the said resin is thermally conductive, so as to improve dissipation of heat from the electronic module.

The invention also makes it possible to achieve savings of scale in the manufacture of the radiator-forming box and in the manufacture of the electronic cards it contains since it is the connection box which serves as the interface and which needs to be fitted to different types of motor.

In other words, it is possible to make different types of connection box all arranged to receive the same type of radiator-forming box.

In a particular embodiment, the connection box includes means for fixing to a motor or a transformer.

Advantageously, the converter includes a thermally insulating gasket at the interface between the radiator-forming box and the connection box.

This insulating gasket ensures that when the motor is operating at low speed so that its cooling fan is turning relatively slowly, the heat given off by the motor is not conducted to the electronic module and does not affect the operation thereof.

Advantageously, the electronic module has one or more electronic power components mounted on the rear face of a card and in thermal contact with the inside face of the rear wall of the radiator-forming box.

Preferably, the inside face of the rear wall of the radiator-forming box has portions in relief arranged to co-operate with the above-mentioned electronic power component(s) so as to facilitate positioning of the electronic card(s) relative to the radiator-forming box.

Advantageously, the electronic module has a card carrying at least one connector for providing electric connection between the converter and electric wires conveying control signals, and also preferably but not necessarily a connector for supplying power and a connector for connection to the motor or the transformer.

Also advantageously, when the electronic module has a plurality of electronic cards, most of the bulky components of the electronic module are mounted on those faces of the electronic cards which face towards the middle of the radiator-forming box, thereby making it possible for the structure to be more compact.

Advantageously, on at least one face, the radiator-forming box has fins in the form of discontinuous parallel ribs creating ranks of ribs in two mutually perpendicular directions, with air being able to flow between the fins in each of the two directions.

Disposing the fins in this way makes it possible to guarantee cooling by convection in two different orientations of the converter relative to the vertical.

Each fin is preferably oblong in cross-section, with two opposite main faces converging towards the tip of the fin.

This shape makes it easy to provide fins that are longer or shorter depending on the power to be dissipated.

The fins are advantageously made using a mold that has one or more interchangeable slides that are selected depending on the length to be given to the fins.

This avoids the need to use a special mold for making fins of different lengths, since the fins can be made to the desired length by selecting the appropriate slide(s).

In addition, the fins remain relatively short and they harden quite quickly, thereby making high rates of throughput possible with injection molding.

The invention also provides an electric machine, e.g. an electric motor, including a converter as defined above.

BRIEF DESCRIPTION OF THE DRAWINGS

Other characteristics and advantages of the present invention will appear on reading the following detailed description of non-limiting embodiments, and on examining the accompanying drawings, in which:

FIG. 1 is a fragmentary and diagrammatic axial section view of a converter of the invention;

FIG. 2 is a side view showing the cards of the electronic module on their own;

FIG. 3 is a plan view looking along arrow III of FIG. 2.

MORE DETAILED DESCRIPTION

Figure 4:
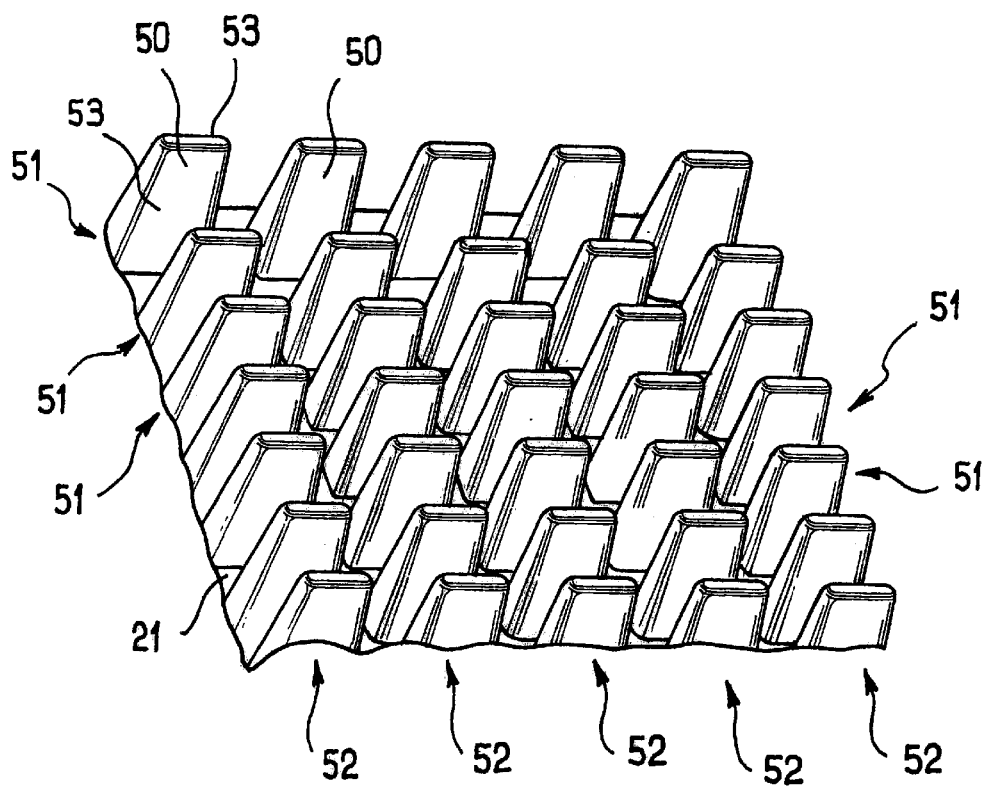
FIG. 4 is a diagrammatic and fragmentary view of the cooling fins made on the rear face of the radiator-forming box.

FIG. 1 shows a converter of the invention, containing an electronic module 10 of power lying in the range 0.25 kilowatts (kW) to 15 kW, for example, and comprising a radiator-forming box 20 that is open to the front and made by injection molding aluminum, the box containing a set of electronic cards 30 constituted in this case by four electronic cards, namely a front card 31, a rear card 32, and two intermediate cards 33 and 34.

FIG. 2 shows the set of electronic cards 30 in isolation.

The front and rear cards 31 and 32 are parallel and perpendicular to the intermediate cards 33 and 34.

In the vicinity of their ends adjacent to the front and rear cards 31 and 32, the intermediate cards 33 and 34 are provided with slots, while the front and rear cards 31 and 32 are provided with connection tongues shaped to engage in the above-mentioned slots.

The connection tongues of the front card 31 carry references 31a to 31d in FIG. 3.

Conductor tracks 35 are made on the connection tongues, said tracks forming integral portions of the printed circuit of the card.

These conductor tracks are electrically connected to the printed circuits of the cards that have slots.

Solder bridges 36 provide electrical continuity between the various cards 31 to 34 via the associated tongues and slots and also serve to prevent the cards from moving relative to one another.

The electrical circuit of the converter can thus be built without using ribbons of conductor wires for interconnecting various cards, unlike the structure of conventional converters.

In the embodiment described, the front and rear cards 31 and 32 have tongues for engaging in corresponding slots provided in the intermediate cards 33 and 34.

Naturally, it would not go beyond the ambit of the invention to provide the intermediate cards 33 and 34 with tongues and the front and rear cards 31 and 32 with slots for receiving those tongues.

It is also possible to provide one of the intermediate cards 33 and 34 with tongues and the other with slots.

In the embodiment described, the front card 31 has a connector strip 37 on its outside face 31e, which strip enables the converter to be connected to electric lines, e.g. conveying control signals to cause the motor to revolve more quickly or more slowly.

Electronic power components 38 are mounted on the rear face 32a of the rear card 32.

These connector power components 38 are pressed against the inside face 21a of the rear wall 21 of the radiator-forming box 20 so as to transfer heat thereto by conduction.

It will be observed on examining FIGS. 1 and 2 that a large fraction of the bulky components 58 of the converter are mounted on those faces of the intermediate cards 33 and 34 that face towards the center of the radiator-forming box 20, thereby making it possible to provide a converter that is particularly compact.

In the embodiment described, the converter has electric cables 39 connected to one of the cards and extending out from the radiator-forming box 20.

A resin 40 that is electrically insulating but thermally conductive is cast into the inside of the radiator-forming box 20 to protect the set of electronic cards 30 from moisture and vibration, and also to improve electrical insulation.

The resin 40 comes up to the level of the front card 31, as can be seen in FIG. 1;

As shown, the inside face 21a of the rear wall 21 of the radiator-forming box 20 has portions in relief 21b for ensuring that the set of electronic cards 30 takes up a predetermined position inside the radiator-forming box 20 before the resin 40 is cast.

These portions in relief 21b are arranged to co-operate with the electronic power components 38.

Advantageously, the radiator-forming box 20 has a plurality of fins 50 on the outside face of its rear wall, which fins are shown diagrammatically in FIG. 4.

The fins 50 are not shown in FIG. 1 in order to clarify the drawing.

The fins 50 are placed in parallel rows 51.

Within each row 51, the fins 50 are placed at regular intervals so that they also make up column alignments 52 perpendicular to the rows 51.

Each fin 50 is elongate in shape in a direction perpendicular to the plane of the rear wall 21, and it has a cross-section that is oblong with its long axis extending parallel to the direction of the rows 51.

On examining FIG. 4, it will be seen that air can flow between two consecutive rows 51 and also between two consecutive columns 52, thereby enabling the converter to be installed either with its rows 51 horizontal, in which case the radiator-forming box 20 is oriented as shown in FIG. 1, i.e. with its intermediate cards 33 and 34 horizontal, or else in a variant with the rows 51 vertical, in which case the intermediate cards 33 and 34 are vertical.

In either case, vertical convection flow of air between the fins 50 is not impeded.

Each fin 50 has two opposite main plane faces 53 which converge at an angle of a few degrees towards the free end of the fin.

Depending on the heat power to be dissipated, the fins 50 are made to be longer or shorter.

In the example described, the fins 50 are integrally formed in the same aluminum as the remainder of the box by using a mold which has a rear slide that is interchangeable, thus making it possible to make longer or shorter fins by selecting an appropriate slide.

Thus, a single mold can be used to make a box having fins of a length that matches the power it is to dissipate.

The generally flattened shape of each fin 50 makes the radiator easier to clean than conventional radiators having a plurality of truncated cones since the plane main faces of the fins provide a relatively large contact area with a cleaning member that is moved parallel to the rows 51.

In the example of FIG. 1, the electronic module 10 is assembled with an electrical connection box 60 fixed to the top portion of the case of an electric motor (not shown).

The radiator-forming box 20 is positioned in such a manner as to lie in the flow of cooling air generated by the fan of the motor.

The connection box 60 has bolts 61 for fixing to the motor and it also has connection terminals 62 that are connected to the motor.

The wires 39 of the converter 10 are connected to these connection terminals 62.

In its top portion, the box 60 has a window 63 providing a user with easy access to the electrical conductors 39, to the connection terminals 62, and to the connector strip 37.

Passages having sealing gaskets are provided through the box 60 in conventional manner to pass the power supply and control wires of the converter 10.

These passages are not shown herein in order to clarify the drawing.

In the embodiment described, the radiator-forming box 20 has a front flange 26 provided with a plurality of fixing screws 23 serving to mount it on the connection box 60.

A thermally insulating gasket 25 is placed around the flange 26 so as to constitute a thermal barrier impeding the transmission of heat from the connection box 60 to the radiator-forming box 20.

This thermal barrier is particularly useful when the motor is operating at low speeds, i.e. when the fan driven by the motor shaft is revolving slowly.

The presence of the gasket 25 then slows down the transmission of heat by conduction from the case of the motor to the radiator-forming box 20.

Figure 5:
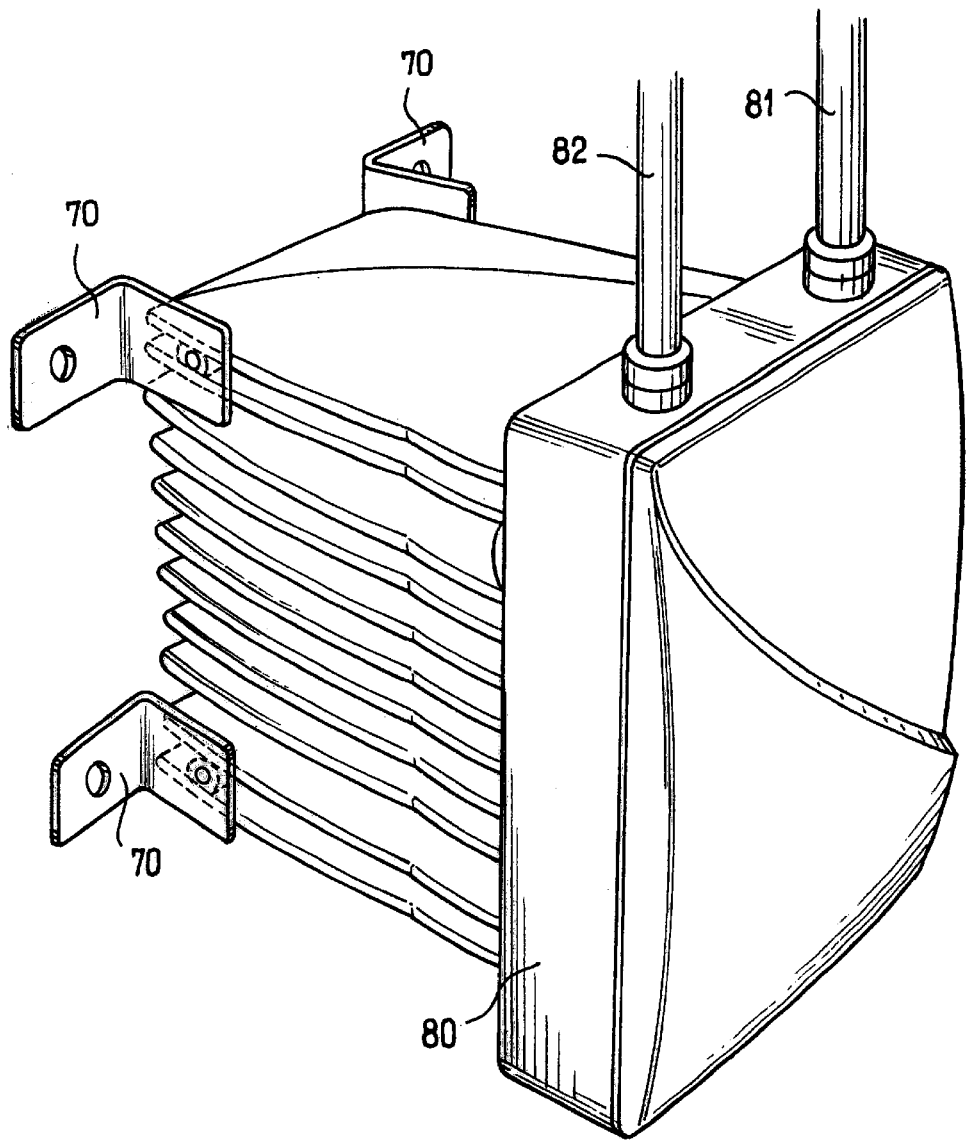
FIG. 5 shows a converter provided with wall-mounting tabs.

The set of electronic cards 30 enables a module to be made which can be assembled to a connection box 60 fixed on a motor, as described above, or in a variant enables it to be received in an independent box, as described below with reference to FIG. 5.

In this figure, wall mounting tabs 70 are provided on the side walls of the box housing the set of electronic cards 30.

In a variant (not shown), these mounting tabs are provided on the rear wall of said box.

An electrical connection box 80 is fixed on the front of the box housing the set of electronic cards 03;

Inlet and outlet cables 81 and 82 are shown connected to the set of electronic cards 30 inside the connection box 80.

If so required by the electrical power to be dissipated, the converter box can have fins of the kind described with reference to FIG. 4.

Naturally, the invention is not limited to the embodiments described above.

In particular, the set of electronic cards 30 could be made with a front card, a rear card, and only one intermediate card if the number of electronic components does not require the use of a second intermediate card.

The orientation of the cards relative to the walls of the box could also be modified.

An intermediate module could be interposed between the electric connection box and the radiator-forming box, e.g. to dissipate heat energy.

One or more electronic power components can be mounted on one of the intermediate cards and can be thermally connected to the radiator-forming box receiving the set of electronic cards.

The motor can be replaced by a transformer, e.g. a transformer housed in the case of a motor having its primary and secondary windings wound on magnetic circuits analogous to those of a stator and of a rotor.

What is claimed is:

1. A converter for one of an electric motor and a transformer, the converter comprising:

a connection box having passages for electrical conductors; and a semiconductor electronic module releasably fixed to the connection box, said electronic module comprising:
 a radiator-forming box having an opening at one end;
 at least one electronic card that is at least partially embedded in a resin cast into the inside of said radiator-forming box; and
 at least one connector emerging from the resin, the opening of the radiator-forming box being arranged in such a manner as to enable said radiator-forming box to be fitted to the connection box, the connection box having at least one window giving access to the said at least one connector of the electronic module.

2. A converter according to claim 1, wherein the connection box has mounting means for mounting on one of a motor and a transformer.

3. A converter according to claim 1, including a thermally insulating gasket at an interface between the radiator-forming box and the connection box.

4. A converter according to claim 1, said converter being part of the electric motor, wherein the radiator-forming box is placed in a flow of air generated by a cooling fan of said electric motor on which the connection box is fixed.

5. A converter according to claim 1, wherein the resin is thermally conductive.

6. A converter according to claim 1, wherein the electronic module has one or more electronic power components mounted on a rear face of a card and in thermal contact with an inside face of a rear wall of the radiator-forming box.

7. A converter according to claim 6, wherein the inside face of the rear wall of the radiator-forming box has portions in detachable arrangement to co-operate with the electronic power component (s).

8. A converter according to claim 1, wherein the electronic module has a card carrying at least one connector for electrically connecting the converter to electric wires conveying control signals and at least a power supply connector for connection to a power supply and a connector for connection to the motor or transformer.

9. A converter according to claim 1, wherein the radiator-forming box has fins on at least one face, the fins being in the form of discontinuous parallel ribs establishing ranks of fins in two mutually perpendicular directions, air being able to flow between the fins in each of the two directions.

10. A converter according to claim 9, wherein each fin has a cross-section that is oblong in shape, with two opposite main plane faces that converge towards a tip of the fin.

11. A method of manufacturing a converter having fins as defined in claim 10, wherein the fins are made using a mold having one or more interchangeable slides that are selected depending on the length to be given to the fins.

12. An electric machine such as an electric motor, including a converter as defined in claim 1.

* * * * *